July 25, 1967
D. F. SALT
3,332,271
UPSETTING TOOLS
Filed Nov. 6, 1964
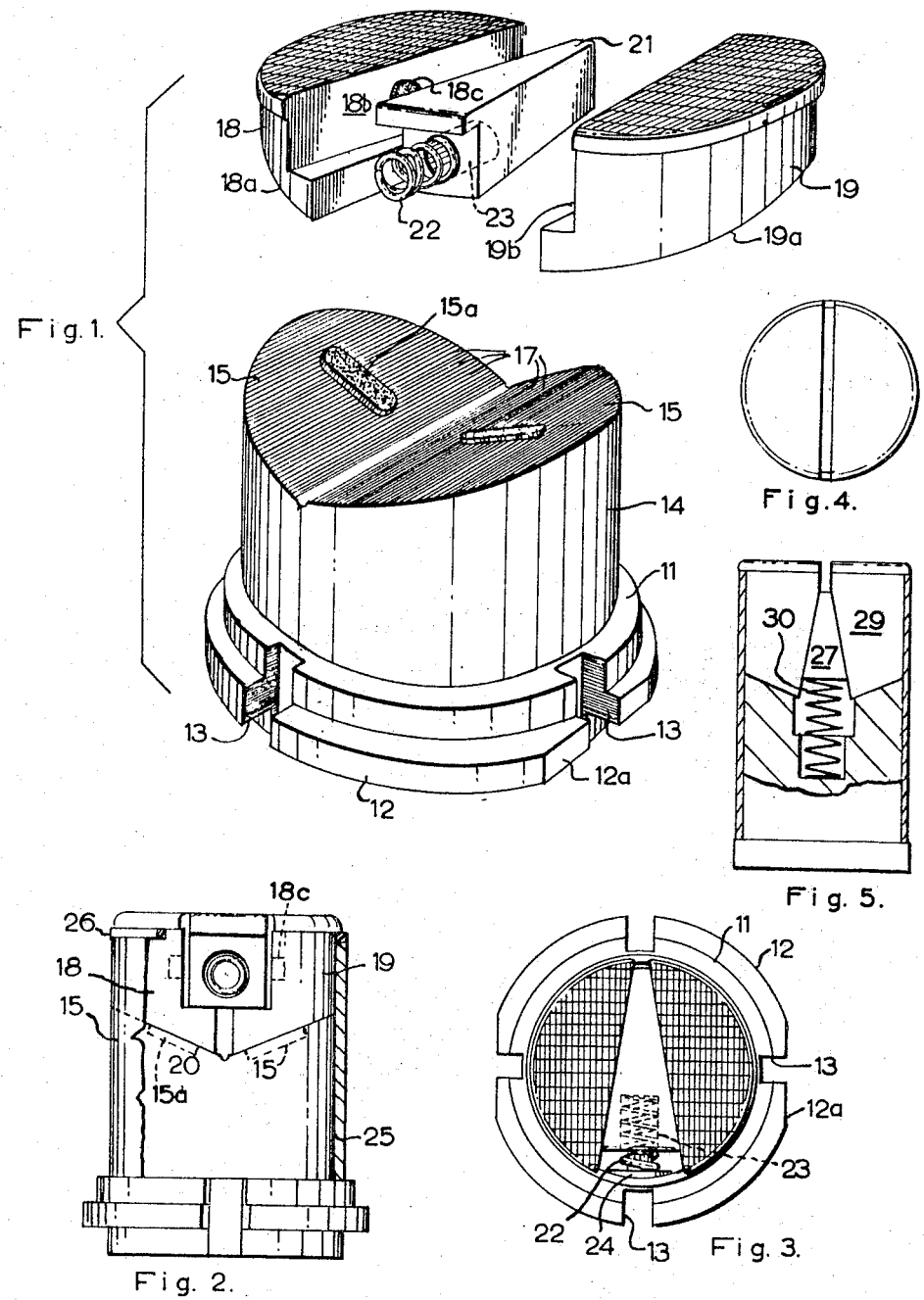
INVENTOR:
Douglas Frank Salt
BY
Bierman & Bierman

United States Patent Office 3,332,271
Patented July 25, 1967

3,332,271
UPSETTING TOOLS
Douglas F. Salt, 46 Stanwell Road, Swinton,
Manchester, England
Filed Nov. 6, 1964, Ser. No. 409,523
9 Claims. (Cl. 72—395)

This invention relates to jaw units of presses for upsetting metal, of the kind (hereinafter termed "the kind referred to") comprising two pairs of work-gripping jaws, the jaws of each pair being adapted to engage the same side of the work and having their working faces lying in a common plane and relatively movable together in that plane and with a wedge piece between them, the working faces of the jaws of each pair having oppositely directed metal-gripping teeth adapted just to bite into the surface of the metal, the jaws being mounted in a holder with complementary compacting inclined surfaces on the jaws and in their holder so as to effect the said relative movement together of the jaws for upsetting the metal between the areas gripped by the complementary opposing jaws.

Generally, the object and purpose of such shrinkage or upsetting treatment of metal is to produce or permit curvature of the metal in the plane of its thickness so that, for example, a straight line drawn on a flat piece of metal would become an arc in the same plane after such treatment, that portion of the metal remaining substantially flat.

To compensate for, and assist, the difference of movement of the metal on either side of such line, it has been proposed in my earlier Patent No. 563,470 to provide complementary arcuate surfaces upon the jaws of the tool and upon a wedge piece between them, such wedge being of such thickness that its face is just below the level of the jaws to allow the same to grip and move the metal, yet provided a support for the metal between the jaws during upsetting and thus to restrain the same from buckling. Such wedge is spring-loaded to enable it to return as the jaw units separate on release of the working pressure with the completion of each upsetting phase.

It is necessary with such a tool to provide a "pre-loading" or gripping pressure of the jaws, against the faces of the metal to be upset, before relative upsetting movement of the jaws is initiated, thereby to provide effective frictional working engagement of the jaws with the surfaces of the metal, including some minute indentation of said surface by the fine saw teeth provided on the working faces of the jaws. Hitherto, such pre-loading has been provided by a compression device, such as springs which resist downward movement of the jaws in their holders necessary for causing such relative upsetting movement of the jaws towards each other. The arcuate shape of the complementary faces on the jaws and wedge as earlier described have provided, at the wider end of the wedge, an included angle such that the loading of the wedge by its return spring would provide only negligible pre-loading for the jaws ineffective for providing the aforesaid frictional working engagement.

The present invention is based upon the appreciation that such arcuate shaping of the complementary faces of the wedge and jaws and the differential movement of the jaws as between the front and rear portions of their working faces, is not required for many uses of the tool, and that the wedge itself could be so shaped and loaded as to provide the required pre-loading of the jaws, thus simplifying the construction of the tool including eliminating the necessity for a compression device as aforesaid.

According to the present invention, a jaw unit of the kind referred to is characterised in that the wedge piece is loaded axially and so shaped as to its angle relative to such axial loading and to the compacting angle (as hereinafter defined) of the jaws as to provide a predetermined pre-load on the work before compacting movement of the jaws can occur.

In the accompanying drawings:

FIG. 1 is an exploded isometric view of one example of the main parts of a jaw unit made in accordance with the present invention.

FIG. 2 is a part-sectional side elevation of the complete jaw unit.

FIG. 3 is a plan of the unit shown in FIG. 2.

FIGS. 4 and 5 are plan and sectional elevation of a modified jaw unit.

As shown in the drawings each jaw comprises a base element formed at one end with annular flanges 11 and 12, with a pair of flats 12a on the latter and axial slots 13, all complementary to the head of the machine to which the jaw is to be fitted. Consequently, for the function of mounting the jaw, this portion of the base element may be of any other suitable shape.

The base element consists essentially of a cylindrical column 14 formed at its upper end with a wide angle V notch providing compacting faces 15 inclined to an inclusive of 136 degrees, with, of course, a small central clearance groove 16, each face being inclined at 22 degrees to a common plane normal to the axis of the cylindrical column which is termed "the compacting angle." The said faces are ground flat and formed with microscopic lubrication grooves 17, as clearly shown in FIG. 1, parallel to the central groove 16, their depth being of the order of 0.002 inch. A lubricant holding pad 15a is provided in a suitable recess in each face 15.

There are a pair of jaws 18 and 19 with inclined compacting under faces 18a and 19a complementary to the face 15. These jaws, at their lower periphery, are slightly less than semi-cylindrical and the radius of their cylindrical periphery is the same as that of the cylindrical column 14. When positioned on such column, as shown in FIG. 2 there is a diametrical gap 20 between their lower portions aforesaid whilst above that gap, each jaw is cut back at 18b and 19b to form a V-shaped rebate in which is slidably located a wedge piece 21, resting on the lower shoulders of the rebates and with its upper surface just below that of the jaws. Lubricant holding pads 18c and 19c are provided in suitable recesses in these faces. All edges and corners of the upper surfaces of the jaws are carefully radiused to avoid possible marking of the work thereby. The upper or working surfaces of the jaws of each pair are formed with oppositely directed saw-toothed grooves in known manner for an upsetting die head.

The wedge piece 21 which also provides support for the work is loaded into the wedge-shaped space between the jaws by a coil spring 22 located in a socket 23 formed in the end of the wedge piece, which spring is fitted on its outer end with a shoe 24 having a cylindrical outer surface complementary to the inner cylindrical surface of a sleeve. 25. The included angle of the wedge which has plane surfaces is 20 degrees and the spring 22 has an initial loading of 12 lbs. when in its normal position as shown in FIG. 3 when movement is arrested by the engagement of the peripheral walls of the jaws with the enclosing sleeve 25. The use of arcuate surfaces for the wedge is not, however, excluded. The relatively inclined sides of the wedge are parallel to the axis of the sleeve 25. A compressible resilient sealing ring 26 is provided which permits movement of the parts and at the same time retains lubricant and excludes dirt. The sliding surfaces of the parts are lubricated with high-pressure lubricating oil.

The unit includes no pressure pad or its equivalent as heretofore provided under the jaws to pre-load them.

In a modification as shown diagrammatically in FIGS. 4 and 5 a wedge 27 is arranged between the jaws 28, 29 for movement perpendicular to their operative faces under the control of a coil spring 30.

In operation, it is found that an effective pre-loading for the jaws is provided by constructing and pre-loading the wedge as above described, thus simplifying the construction and operation of the jaw units especially when having plane instead of arcuate faces for the complementary sliding surfaces of the wedge and jaws and by eliminating any necessity for a compression spring pad or other equivalent loading beneath the jaws themselves, as hitherto provided. The jaws are returned to their normal position in their retaining sleeves by the wedges on release of the axial pressure on their working faces.

Excessive pre-loading results only in unnecessary penetration of the surface of the metal by the teeth of the jaws and this is obviously undesirable. Therefore, the loading of the spring for the wedge is preferably adjustable so that the degree of pre-loading may be adjusted to suit any particular job in hand, the idea being to reduce pre-loading to a minimum consistent with avoiding skidding or undue relative movement of the jaws on the surface of the metal. Any convenient means may be adopted for providing such adjustment, preferably operable while the machine is working.

I claim:

1. An upsetting tool comprising a base having a pair of compacting faces at an angle to one another, each of said faces forming a compacting angle, a pair of jaws each having a jaw face substantially complementary to said compacting faces and adapted to cooperate therewith, said jaws being movable toward and away from each other, a rebate in each of said jaws forming a generally wedge-shaped opening between said jaws, a wedge between said jaws and in said opening, said wedge being axially loaded whereby a pre-load is placed on a work piece before compacting movement of said jaws can occur.

2. A tool according to claim 1 wherein there is provided a clear groove at the intersection of said compacting faces.

3. A tool according to claim 1 wherein there is provided a coil spring, a socket in said wedge, said spring being in said socket.

4. A tool according to claim 1 wherein there is a plurality of lubricating grooves in said compacting faces.

5. A tool according to claim 1 wherein said rebate forms a shoulder on each of said jaws, said wedge resting on said shoulders.

6. A tool according to claim 1 wherein said wedge is provided with sides perpendicular to the upper surface thereof.

7. A tool according to claim 1 wherein recessed lubricating means is provided in said compacting faces.

8. A tool according to claim 1 wherein said wedge has an upper surface, each of said jaws having a top surface, said upper surface being below said top surface.

9. A tool according to claim 1 wherein said compacting faces are on an upper end of a column, said column having a base provided with means for being gripped whereby said column can be held in a substantially fixed position.

References Cited

UNITED STATES PATENTS

| 2,010,996 | 8/1935 | Junkers | 72—395 |
| 2,364,938 | 12/1944 | Beard | 72—395 |

FOREIGN PATENTS

| 137,102 | 11/1959 | Russia. |

HARRISON L. HINSON, *Primary Examiner.*